US010071677B2

(12) United States Patent
Park (10) Patent No.: US 10,071,677 B2
(45) Date of Patent: Sep. 11, 2018

(54) LIGHTING DEVICE FOR VEHICLE

(71) Applicant: LG ELECTRONICS INC., Seoul (KR)

(72) Inventor: Jun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/470,051

(22) Filed: Mar. 27, 2017

(65) Prior Publication Data

US 2017/0291531 A1    Oct. 12, 2017

Related U.S. Application Data

(60) Provisional application No. 62/314,544, filed on Mar. 29, 2016.

(30) Foreign Application Priority Data

Jun. 9, 2016    (KR) .................. 10-2016-0071937

(51) Int. Cl.
*B60Q 1/14*        (2006.01)
*F21V 7/22*        (2018.01)
(Continued)

(52) U.S. Cl.
CPC .............. *B60Q 1/1423* (2013.01); *F21S 8/10* (2013.01); *F21S 43/00* (2018.01); *F21V 7/05* (2013.01);
(Continued)

(58) Field of Classification Search
CPC ......... B60Q 1/1423; B60Q 1/04; F21S 43/00; F21S 8/10; F21V 7/05; F21V 7/22;
(Continued)

(56) References Cited

U.S. PATENT DOCUMENTS 8,690,406 B2 *    4/2014    Drenten .................... F21V 9/08
362/545
9,223,071 B2 *    12/2015    Takahira .............. G02B 6/0003
(Continued)

FOREIGN PATENT DOCUMENTS

DE        102008019118        10/2009
DE        102014217521        3/2016
(Continued)

OTHER PUBLICATIONS

"Laser Beam Collimation" Apr. 2, 2016, XP55400365, Retrieved from the Internet: URL:http://integratedoptics.com/laser-beam-collimation, 6 pages.
(Continued)

*Primary Examiner* — Mary Ellen Bowman
(74) *Attorney, Agent, or Firm* — Fish & Richardson P.C.

(57) ABSTRACT

A lighting device for a vehicle may include a light source; a lens; and a first reflecting unit provided on a partial area of a front surface of the lens. The lighting device may also include a light reducer configured to reduce a size of light emitted from the light source and to emit light having a reduced size toward the first reflecting unit on the lens. The lighting device may further include a reflective fluorescent body disposed on a rear side of the lens and configured to convert a wavelength of light reflected from the first reflecting unit and to reflect light having a converted wavelength into the lens.

20 Claims, 5 Drawing Sheets

(51) Int. Cl.
  *F21V 7/05*   (2006.01)
  *F21V 14/04*  (2006.01)
  *F21S 8/10*   (2006.01)
  *G02B 3/00*   (2006.01)
  *F21S 43/00*  (2018.01)
  *B60Q 1/04*   (2006.01)

(52) U.S. Cl.
  CPC ............ *F21V 7/22* (2013.01); *F21V 14/04* (2013.01); *G02B 3/0037* (2013.01); *B60Q 1/04* (2013.01); *G02B 2003/0093* (2013.01); *G02B 2207/113* (2013.01)

(58) Field of Classification Search
  CPC ............ F21V 14/04; G02B 3/0037; G02B 2003/0093; G02B 2207/113
  See application file for complete search history.

(56) References Cited

U.S. PATENT DOCUMENTS

| | | | |
|---|---|---|---|
| 9,228,710 B2* | 1/2016 | Takahashi | F21S 41/14 |
| 9,249,951 B2* | 2/2016 | Hadrath | G02B 19/0047 |
| 2005/0057917 A1* | 3/2005 | Yatsuda | H01L 33/507 |
| | | | 362/84 |
| 2011/0216550 A1* | 9/2011 | Koike | F21S 41/16 |
| | | | 362/519 |
| 2012/0206931 A1* | 8/2012 | Nakazato | F21S 41/16 |
| | | | 362/510 |
| 2015/0375672 A1 | 12/2015 | Takahashi | |
| 2017/0293052 A1* | 10/2017 | Park | G02B 3/0037 |
| 2017/0305330 A1* | 10/2017 | Park | B60Q 1/1423 |
| 2017/0356614 A1* | 12/2017 | Park | F21S 41/16 |
| 2017/0356617 A1* | 12/2017 | Park | F21S 41/16 |
| 2018/0038567 A1* | 2/2018 | Park | F21S 48/17 |

FOREIGN PATENT DOCUMENTS

| | | |
|---|---|---|
| EP | 3086022 | 10/2016 |
| JP | 2004-085725 | 3/2004 |
| JP | 2014-178464 | 9/2014 |
| KR | 10-2008-0082345 | 9/2008 |
| KR | 10-2015-0072929 | 6/2015 |
| KR | 10-2016-0012470 | 2/2016 |
| WO | 2014/121707 | 8/2014 |
| WO | 2015/098130 | 7/2015 |

OTHER PUBLICATIONS

Extended European Search Report in European Application No. 17162309.9, dated Sep. 11, 2017, 10 pages.
Notice of Allowance in Korean Application No. 10-2016-0071937, dated Sep. 11, 2017, 7 pages (with English translation).
Office Action in Korean Application No. 10-2016-0071937, dated Apr. 19, 2017, 12 pages (with English translation).

* cited by examiner

LIGHTING DEVICE FOR VEHICLE

CROSS-REFERENCE TO RELATED APPLICATIONS

The present application claims the benefit of an earlier filing date and right of priority under 35 U.S.C. 119 and 35 U.S.C. 365 to U.S. Provisional Patent Application No. 62/314,544 filed on Mar. 29, 2016 and Korean Patent Application No. 10-2016-0071937 filed on Jun. 9, 2016 the contents of which are hereby incorporated by reference in their entirety.

TECHNICAL FIELD

The present disclosure relates to a lighting device for a vehicle.

BACKGROUND

Vehicles typically implement a lighting device, such as a lamp, designed to improve a driver's visibility or inform people outside the people of a current running state of the vehicle. Such lighting devices typically increase an intensity of illumination of the surroundings of the vehicle during running of the vehicle.

A lighting device for a vehicle installed in the vehicle, hereinafter referred to simply as "a lighting device for a vehicle," typically includes, for example, a head lamp which irradiates light to the front of the vehicle and a rear lamp which displays a heading direction of the vehicle or indicates whether a brake of the vehicle is operated.

A lighting device for a vehicle is typically designed to form a low beam or a high beam for securing visibility of a driver. For example, some vehicles implement a lighting device with a light source as an LED which has a high power efficiency and a long service life. As another example, some vehicles implement a laser diode as a light source having a longer irradiation distance than an LED.

SUMMARY

In one aspect, a lighting device for a vehicle may include a light source; a lens; and a first reflecting unit provided on a partial area of a front surface of the lens. The lighting device may also include a light reducer configured to reduce a size of light emitted from the light source and to emit light having a reduced size toward the first reflecting unit on the lens. The lighting device may further include a reflective fluorescent body disposed on a rear side of the lens and configured to convert a wavelength of light reflected from the first reflecting unit and to reflect light having a converted wavelength into the lens.

In some implementations, the front surface of the lens may have a convex shape, and the first reflecting unit may be configured with a cross sectional shape that is an arc shape.

In some implementations, the first reflecting unit may be a concave mirror which is formed in the front surface of the lens.

In some implementations, the first reflecting unit may be a reflective coating layer which is coated on a portion of the front surface of the lens that does not intersect an optical axis of the lens.

In some implementations, the reflective fluorescent body may be disposed to face a rear surface of the lens and may be configured to reflect, toward the rear surface of the lens, the light having the converted wavelength.

In some implementations, the light reducer may be disposed at a position between the lens and the light source.

In some implementations, the reflective fluorescent body may be disposed on an optical axis of the lens, and the light reducer may be disposed apart from the optical axis of the lens.

In some implementations, the light reducer may be disposed on a rear side of the lens and may be configured to emit the light having the converted wavelength in a direction parallel to an optical axis of the lens.

In some implementations, the light reducer may include: a first reducer lens configured to reduce a width of light transmitted therethrough that was emitted from the light source; and a second reducer lens that is spaced apart from the first reducer lens and that is configured to reduce a width of light transmitted therethrough that was emitted from the first reducer lens.

In some implementations, an emitting surface of the first reducer lens and an incident surface of the second reducer lens may be spaced apart from each other.

In some implementations, a diameter of the second reducer lens may be smaller than a diameter of the first reducer lens.

In some implementations, a thickness of the second reducer lens may be smaller than a thickness of the first reducer lens.

In some implementations, an incident surface of the first reducer lens on which light is incident may have a convex shape.

In some implementations, an emitting surface of the second reducer lens from which light is emitted may have a concave shape.

In some implementations, an optical axis of the first reducer lens may be the same as an optical axis of the second reducer lens.

In some implementations, an incident surface of the first reducer lens may be configured to face the light source, and an emitting surface of the second reducer lens may be configured to face a rear surface of the first lens.

In some implementations, the first reducer lens and the second reducer lens may be configured such that an optical axis of the first reducer lens intersects with an optical axis of the second reducer lens.

In some implementations, the lighting device may further include: a reflecting member configured to reflect, to the second reducer lens, the light emitted from the first reducer lens.

In some implementations, the reflective fluorescent body may be disposed on an optical axis of the lens, and the light reducer may be arranged to be spaced apart from the reflective fluorescent body in the optical axis of the lens.

In some implementations, the lighting device may further include: a second reflecting unit provided to be spaced apart from the first reflecting unit on the front surface of the lens and configured to reflect, to a rear side of the lens, light that is reflected from the reflective fluorescent body.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

Implementations are described herein that enable a lighting device for a vehicle that implements a reflecting unit and a reflective fluorescent body that are arranged with respect to a lens to provide efficient functionality.

In some implementations, the lighting device implements reflective components that perform multiple reflections of light irradiated from a light source, and then projects the light to an outside of the vehicle.

According to an implementation, light from a light source is reduced in size by a light reducer, before being incident on a first reflecting unit, and then being reflected to a reflective fluorescent body that reflects the light through a lens. As such, the size of the lens may be reduced and lens may be made compact. Further, the first reflecting unit may be provided on an area of a front surface of the lens, thus further reducing the number of components in the lighting device and further reducing the size of the lens.

Hereinafter, examples of implementations will be described in detail with reference to the drawings.

Figure 1:
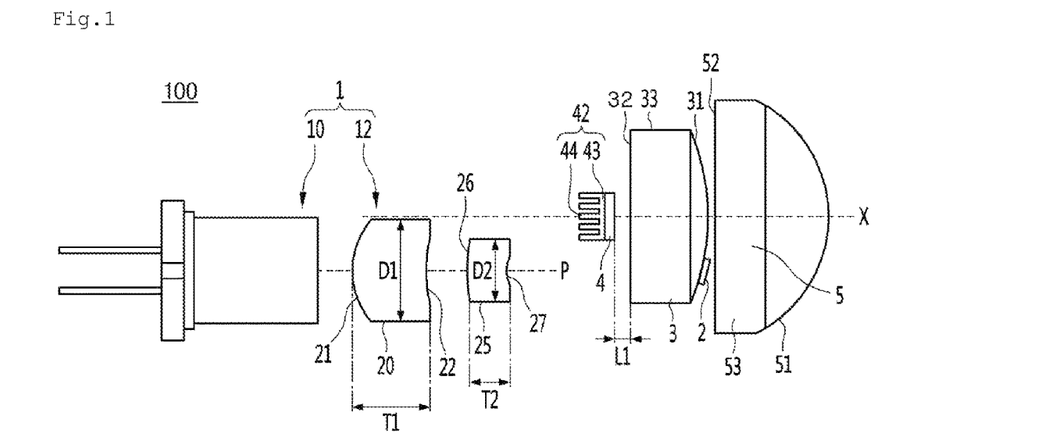
FIG. 1 is a diagram illustrating an example of a lighting device for a vehicle according to a first implementation.
Figure 2:
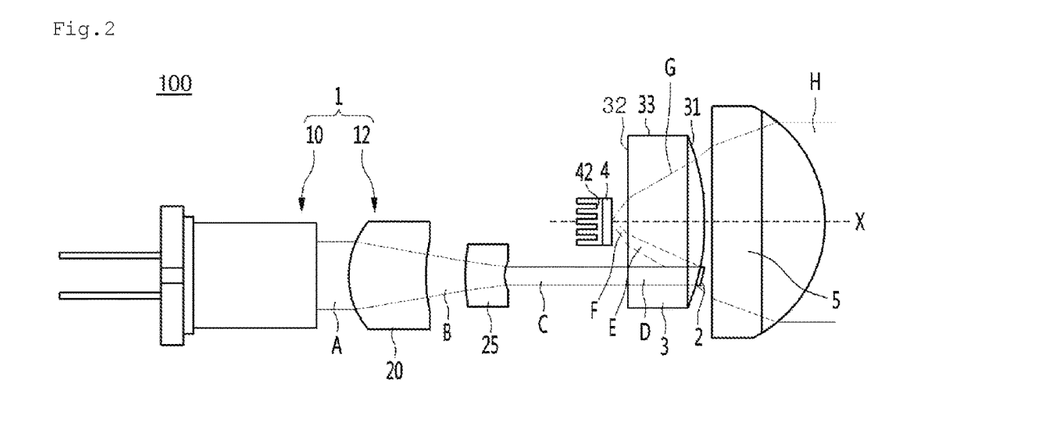
FIG. 2 is a diagram illustrating an example of an optical path of a lighting device for a vehicle according to the first implementation.
Figure 3:
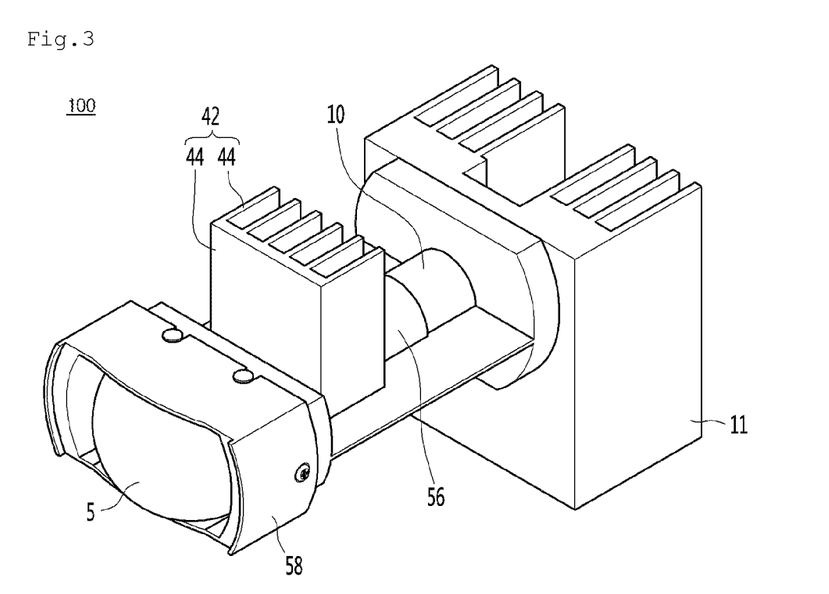
FIG. 3 is a diagram illustrating an example of a lighting device for a vehicle according to the first implementation.

FIG. 1 is a diagram illustrating an example of a lighting device for a vehicle according to a first implementation, FIG. 2 is a diagram illustrating an example of an optical path of the lighting device for a vehicle according to the first implementation, and FIG. 3 is a perspective view illustrating an example of the lighting device for a vehicle according to the first implementation.

In some implementations, the lighting device for a vehicle may constitute a head lamp of the vehicle and may be used as a high beam lighting device which generates a high beam or may be used as a low beam lighting device which generates a low beam.

In the examples of FIGS. 1 to 3, the lighting device 100 for a vehicle includes a light source apparatus 1, a first reflecting unit 2, and a lens 3.

The light source apparatus 1 is configured to emit light toward the first reflecting unit 2. For example, as shown in FIGS. 1 and 2, the light source apparatus 1 may be configured to emit light toward lens 3, so that the light transmits through lens 3 and is incident on the first reflecting unit 2. In some implementations, the light source apparatus 1 may be configured to emit light toward a rear surface of lens 3, so that the light incident on the rear surface of lens 3 from the light source apparatus 1 transmits through lens 3 and is incident on the rear surface of the first reflecting unit 2.

The light source apparatus 1 may include a light source 10 that emits light, and a light reducer 12 that reduces the size of the light emitted from light source 10, as shown in the examples of FIGS. 1 and 2. The light source 10 may receive electric energy and convert the electric energy into light energy, for example using a light emitting source such as an ultra-high pressure mercury lamp (UHV Lamp), a light emission diode (LED), or a laser diode.

The light source 10 may be a light source which is configured to be irradiated with light from a long distance while having an excellent feature of straightness and high efficiency. In some implementations, the light source 10 preferably is a laser diode. For example, the light source 10 may preferably be a laser diode which irradiates with a blue based laser light having high efficiency.

The light source apparatus 1 may further include a light reducer, such as light reducer 12 in FIGS. 1 and 2. The light reducer 12 may be configured to reduce a size of the light emitted from the light source 10, and emit the reduced-size light toward the first reflecting unit 2. As such, light emitted from the light source 10 may pass through the reducer 12 and then may be emitted toward the first reflecting unit 2. Further details of the light reducer 12 will be described below.

As shown in the examples of FIGS. 1 and 2, the lighting device 100 may also include a reflective fluorescent body 4, which may be configured to convert a wavelength of incident light and emit wavelength-converted light. For example, as shown in FIG. 2, light that is reflected from the first reflecting unit 2 may be incident on the reflective fluorescent body 4, which may convert a wavelength of the incident light and emit wavelength-converted light towards the lens 3.

In some implementations, the lens 3 may have a larger size than the size of the reflective fluorescent body 4 and the first reflecting unit 2. As such, the lens 3 may be configured to protect the reflective fluorescent body 4 and the first reflecting unit 2 at the front side of the reflective fluorescent body 4.

The lens 3 may have, for example, a cylindrical shape or polygonal pillar shape. The lens 3 may include a front surface 31, a rear surface 32, and a peripheral surface 33, as illustrated in FIGS. 1 and 2.

The front surface 31 of lens 3 may have a convex curved surface toward the front side. The rear surface 32 of lens 3 may have a flat surface or a recessed curved surface toward the front side.

The lens 3 may have an optical axis X. The front surface of lens 3 may be a convex condensing lens and may be symmetrical about the optical axis X. As shown in FIGS. 1 and 2, the optical axis X of the lens 3 may be a rotational symmetrical axis or a center axis of lens 3 and may refer to a straight line which passes through the centers of the front surface 31 and the rear surface 32 of lens 3.

The lighting device 100 for a vehicle may further include a projection lens 5 disposed on the front surface of the lens 3, as shown in FIGS. 1 to 3.

The projection lens 5 may have a greater size than the size of the lens 3. The optical axis of the projection lens 5 may be matched and aligned with the optical axis X of the lens 3, as shown in FIGS. 1 and 2.

The projection lens 5 may include a front surface 51, a rear surface 52, and a peripheral surface 53. The front surface 51 of the projection lens 5 may be a convex surface toward the front side. The rear surface 52 of the projection lens 5 may be a flat surface. The projection lens 5 may have a symmetrical structure about the optical axis.

The reflective fluorescent body 4 may be disposed on the rear side of the lens 3 and reflect light from the first reflecting unit 2 to the lens 3.

In some implementations, reflective fluorescent body 4 may be arranged to be spaced apart from the lens 3. For example, as shown in FIGS. 1 and 2, the reflective fluorescent body 4 may be disposed on the rear side of the lens 3 to be spaced apart from the lens 3. As such, in some implementations, heat that is generated at the reflective fluorescent body 4 during wavelength conversion of light may be mitigated from affecting the lens 3.

The reflective fluorescent body 4 may be disposed to face the rear surface 32 of the lens 3 and may reflect light toward the rear surface 32 of the lens 3. In some implementations, the front surface of the reflective fluorescent body 4 may be parallel to the rear surface 32 of the lens 3.

As shown in FIGS. 1 and 2, in some implementations, the reflective fluorescent body 4 may be disposed on the optical axis X of the lens 3, so that the center of the reflective fluorescent body 4 may be aligned with the optical axis X of lens 3. However, implementations are not limited thereto.

For example, in some implementations, the reflective fluorescent body 4 may be eccentrically disposed with respect to the optical axis X of the lens 3, so that the center of reflective fluorescent body 4 is not aligned with the optical axis X of lens 3. However, in this case, the lighting efficiency may be reduced because an area of the lens 3 through which light reflected at the reflective fluorescent body 4 is transmitted may be smaller than the area in a case where the reflective fluorescent body 4 is aligned with the optical axis X of the lens 3.

Further, in a case where the reflective fluorescent body 4 may be disposed to be eccentric with respect to the optical axis X of the lens 3, the area through which light reflected from the reflective fluorescent body 4 is transmitted may be asymmetrical with respect to the other area in the projection lens 5. In this case, the manufacturing process of the projection lens 5 may be more complicated, and thus the manufacturing cost of the projection lens 5 may be increased.

In implementations where the reflective fluorescent body 4 is disposed on and aligned with the optical axis X of lens 3, the projection lens 5 is formed to be symmetrical about the optical axis X, and thus the manufacturing cost of the projection lens 5 may be reduced.

As such, in some implementations, the reflective fluorescent body 4 is preferably disposed on the optical axis X of the lens 3, so that the center of the reflective fluorescent body 4 is aligned on the optical axis X of the lens 3, as shown in the examples of FIGS. 1 and 2.

The reflective fluorescent body 4 may include a wavelength conversion layer which faces the rear surface 32 of the lens 3. The reflective fluorescent body 4 may also include a reflecting unit which is disposed on the rear side of the wavelength conversion layer.

The wavelength conversion layer may be made of a wave conversion film and may include an opto-ceramic material. The wavelength conversion layer is configured to convert the wavelength of the light reflected at the first reflecting unit in a state of being positioned at the front side of the reflecting unit. For example, if blue-based light is incident from the outside, the wavelength conversion layer may be a wavelength conversion film that converts the blue-based light into yellow-based light. The wavelength conversion layer may include an opto-ceramic having yellow color. However, the wavelength conversion properties are not limited to these specific colors, and the wavelength conversion layer may be configured to convert between any suitable wavelengths of light.

The reflecting unit may include a plate and a reflecting coating layer which is coated the outside surface of the plate. The plate may be, in some implementations, made of a metal. The reflecting unit may support the wavelength conversion layer and light transmitted through the wavelength conversion layer may be reflected toward the rear surface 32 of the lens 3 by the reflect unit.

When blue based light is reflected to the reflective fluorescent body 4 by the first reflecting unit 2 in the surface of the wavelength conversion layer, a portion of the blue based light is surface-reflected and the light which is incident on the inner portion of the wavelength conversion layer of the blue based light is configured to be excited in the inner portion of the wavelength conversion layer and the light may be reflected in the front side of the wavelength conversion layer by the reflecting unit.

The blue based light which is surface-reflected from the surface of the wavelength conversion layer and yellow based light which is emitted to the front side of the wavelength conversion layer may be mixed and white based light is emitted to the front side of the front surface of the reflective fluorescent body 4. This white based light may be transmitted through the lens 3 and may be emitted toward the front side of the lens 3.

A distance L1 between the reflective fluorescent body 4 and the lens 3 may determine the width of the lighting device 100 for a vehicle in the longitudinal direction, and preferably, the reflective fluorescent body 4 is closely disposed to the lens 3 within the range in which the damage of the lens 3 by heat is mitigated.

The heat radiating member 42 which assists to radiate heat of the reflective fluorescent body 4 may be disposed in the reflective fluorescent body 4. The heat radiation member 42 may include a contact plate 43 which is in contact with the reflective fluorescent body 4, and a heat radiation fin 44 which is projected from the contact plate 43.

The contact plate 43 may be attached to the rear surface of the reflecting unit to be surface-contact.

The first reflecting unit 2 may be provided to reflect the incident light to the reflective fluorescent body 4.

The first reflecting unit 2 is provided on lens 3 to be integrated with the lens 3 or is provided separately from the lens 3 spaced apart from the lens 3.

The first reflecting unit 2 may be determined the position thereof according to an arrangement position of the reflective fluorescent body 4. In a case where the reflective fluorescent body 4 may be disposed on the rear side of the lens 3, the first reflecting unit 2 is positioned on the rear side of the lens 3 to be spaced apart from the lens 3, provided on the rear surface of the lens 3, is provided on the front surface of the lens or is positioned on the front side of the lens 3 to be spaced apart from the lens 3.

The first reflecting unit 2 allows the light emitted from the light source apparatus 1 to reflect between the reflective fluorescent body 4 and the lens 3, in a state where the first reflecting unit 2 is provided on the rear side of the lens 3 to be spaced apart from the lens 3.

The first reflecting unit 2 allows the beam emitted from the light source apparatus 1 to reflect between the reflective fluorescent body 4 and the lens 3, in a state where the first reflecting unit 2 is provided on the rear surface of the lens 3 to be integrated with the lens 3.

The first reflecting unit 2 allows the light transmitted through the lens 3 after being emitted from light source apparatus 1 to reflect to the lens 3 to be reflected toward on the reflective fluorescent body 4, in a state where the first reflecting unit 2 is provided on the front surface of the lens 3 to be integrated with the lens 3.

The first reflecting unit 2 allows the beam transmitted through the lens 3 after being emitted from light source apparatus 1 to reflect to the lens 3 to be reflected toward on the reflective fluorescent body 4, in a state where the first reflecting unit 2 is provided on the front side of the lens 3 to be spaced apart from the lens 3.

In a case where the first reflecting unit 2 is provided the rear side or the front side of the lens 3 to be spaced apart from lens 3, the component number of the lighting device 100 for a vehicle may be increased and the size of the lighting device 100 for a vehicle may be increased by the separating distance between the lens 3 and the first reflecting unit 2 from each other.

In some implementations, the first reflecting unit 2 is provided in the front surface 31 or the rear surface 32 of the lens to be integrated with each other. Such a configuration may reduce the number of components in the lighting device 100 for a vehicle, and thus improve compactness of the lighting device 100.

In a case where the first reflecting unit 2 is provided on the entirety of the rear surface or the entirety of the front surface of lens 3, the first reflecting unit 2 reflects all or substantially all the light reflected from the reflective fluorescent body 4 to rear side of lens 3, and prevents the light reflected from the reflective fluorescent body 4 from being emitted to the front side of the lens 3.

Figure 6:
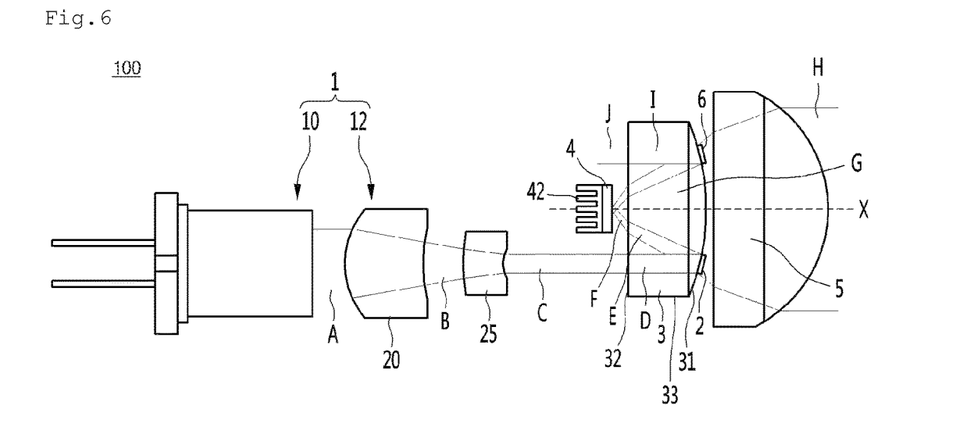
FIG. 6 is a diagram illustrating an example of an optical path of a lighting device for a vehicle according to a fourth implementation.
Figure 7:
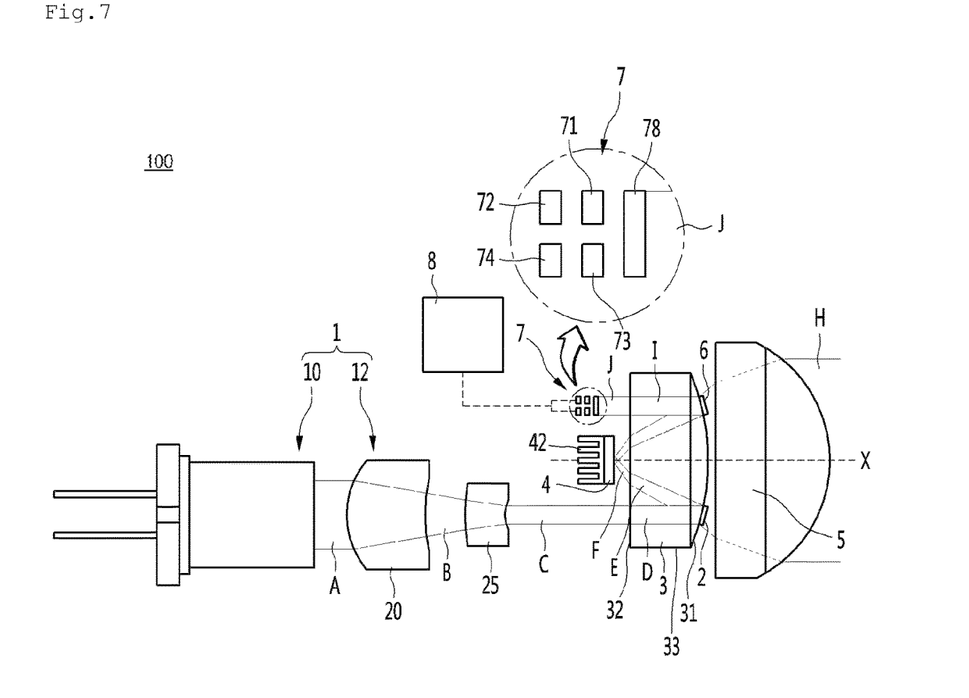
FIG. 7 is a diagram illustrating an example of an optical path of a lighting device for a vehicle according to a fifth implementation.

As such, in some implementations, the first reflecting unit 2 is preferably provided on only a portion of the rear surface of the lens 3 or only a portion of the front surface of the lens 3, without covering the entirety of the surface. For example, the first reflecting unit 2 may be provided on only a portion of the surface with a size that allows lens 3 transmit light through a sufficient light emitting area of lens 3. In some implementations, the first reflecting unit 2 is positioned at a portion on the surface of lens 3 that is not aligned with the optical axis X of the lens, and thus spaced apart from the optical axis X of lens 3. Preferably, the first reflecting unit 2 is positioned on the surface of lens 3 between the optical axis X of the lens 3 and the perimeter surface 33 of lens 3, as shown in FIGS. 6 and 7.

The first reflecting unit 2 may be provided on a portion area of the rear surface of the lens 3 or a portion area of the front surface of the lens 3. The first reflecting unit 2 may be provided to reflect the light emitted from the light source apparatus 1 to the reflective fluorescent body 4.

Preferably, the first reflecting unit 2 may reflect the incident light to the rear side of lens 3.

In some implementations, the position of the first reflecting unit 2 may be determined considering the distance between the reflective fluorescent body 4 and the lens 3.

Preferably, the reflective fluorescent body 4 is disposed close to the rear surface 32 of the lens 3, and the first reflecting unit 2 is provided on the front surface 31 of the lens 3.

For example, the first reflecting unit 2 may be provided on a portion of the front surface of lens 3 such that light emitted from light source apparatus 1 and reducer 12 may be transmitted through lens 3 and then may be incident on the first reflecting unit 2. The light which is then reflected from the first reflecting unit 2 may be transmitted through lens 3 and may be incident on the reflective fluorescent body 4. The reflective fluorescent body 4 may convert a wavelength of this incident light and reflect the wavelength-converted light be transmitted through lens 3, and subsequently irradiated to the front side of the lighting device 100. In some implementations, the lens 3 may be three-path lens through which light is transmitted three times. As such, the lighting device 100 for a vehicle may be made more compact by implementing such a three-path lens 3.

The first reflecting unit 2 may be formed according to a convex front surface 31 in a portion of a convex front surface 31 of the lens 3 and the cross-sectional shape of the first reflecting unit 2 may be formed as an arc-shape. The first reflecting unit 2 may have a round shape or a polygonal shape when viewed from the front side of lens 3.

In some implementations, the first reflecting unit 2 may be a concave mirror formed on the front surface 31 of lens 3. The first reflecting unit 2 may have a convex front surface and a concave rear surface.

The front surface of the first reflecting unit 2 may face the projection lens 5 described below. The first reflecting unit 2 may be projected by the lens 3 and the projection lens 5 between the lens 3 and the projection lens 5.

The first reflecting unit 2 may be a reflective coating layer coated on a portion of the front surface 31 of lens 3 such that the first reflecting unit 2 does not intersect the optical axis X of the lens 3. Alternatively, the first reflecting unit 2 may be a reflective sheet attached to the portion of the front surface 31 of lens 3 that does not intersect the optical axis X of the lens 3.

The light reducer 12 may be disposed between the lens 3 and the light source 10. For example, the light reducer 12 may be disposed between the rear surface 32 of the lens 3 and the front surface 31 of the light source 10, and spaced apart from the lens 3 and the light source 10 respectively.

In some implementations, the light reducer 12 may be spaced apart from the optical axis X of the lens 3. For example, as shown in the example of FIG. 1, the light reducer 12 may have an optical axis P and the lens 3 may have an optical axis X. The light reducer may be arranged such that its optical axis P is not aligned with the optical axis X of the lens 3. With this arrangement, a portion of the light reducer 12 may be positioned on the optical axis X of the lens 3, as long as the optical axis P of the light reducer 12 is spaced apart from the optical axis X of the lens 3.

The light reducer 12 is disposed on the rear side of the lens 3 and may emit light in the direction parallel to the optical axis X of the lens 3. The optical axis P of the light reducer 12 may be parallel to the optical axis X of the lens 3.

The light reducer 12 may include a first reducer lens 20 in which light width is reduced while the light emitted from the light source 10 transmits through the first reducer lens 20 and a second reducer lens 30 which is spaced apart from the first reducer lens 20 and in which light width is reduced while the light emitted from the first reducer lens 20 transmits through the second reducer lens 30.

The first reducer lens 20 has an incident surface 21 and an emitting surface 22 and the second reducer lens 25 has an incident surface 26 and an emitting surface 27.

The emitting surface 22 of the first reducer lens 20 and the incident surface 26 of the second reducer lens 25 is space apart from each other. The emitting surface 22 of the first reducer lens 20 and the incident surface 26 of the second reducer lens 25 may be space apart in the direction parallel to the optical axis X of the lens 3. The first reducer lens 20 and the second reducer lens 25 may be spaced apart having air between the first reducer lens 20 and the second reducer lens 25.

The first reducer lens 20 and the second reducer lens 25 may be spaced apart in the longitudinal direction. The emitting surface 22 of the first reducer lens 20 and the incident surface of the second reducer lens 25 is space apart in the longitudinal direction.

The first reducer lens 20 may be positioned between the light source 10 and the second reducer lens 25 and the second reducer lens 25 may be positioned between the first reducer lens 20 and the lens 3.

The incident surface 21 of the first reducer lens 20 may face the light source 10.

The optical axis P of the first reducer lens 20 and the optical axis of the second reducer lens 25 may be the same each other.

The emitting surface 27 of the second reducer lens 25 may face the rear surface 32 of the lens 3. Preferably, the emitting surface 27 of the second reducer lens 25 does not face a heat radiating member 42 or the reflective fluorescent body 4.

The incident surfaces, on which light is incident, of first reducer lens 20 and the second reducer lens 25 may have a convex shape. The emitting surfaces, from which light is emitted, of first reducer lens 20 and the second reducer lens 25 may have a concave shape.

The rear surface of the first reducer lens 20 may be the incident surface 21 and the incident surface 21 may have a convex curved surface toward the rear side. The light which is incident from the light source 10 may be refracted at the convex incident surface 21 and the width of the light which transmits through the first reducer lens 20 may be gradually reduced, as illustrated in FIG. 2.

The front surface of the first reducer lens 20 may be the emitting surface 22 and the emitting surface 22 may have a concave depression curved surface toward the rear side. In some implementations, the entire front surface of the first reducer lens 20 may have a concave depression emitting surface 22. In some implementations, only the center portion of the front surface of the first reducer lens 20 may have the concave depression emitting surface 22.

A portion of the emitting surface 22 of the first reducer lens 20 may face the incident surface 26 of the second reducer lens 25.

The rear surface of the second reducer lens 25 may be the incident surface 26 and the incident surface 26 may have a convex curved surface toward the rear side. The light which is emitted from the first reducer lens 20 and then passes through the air between the first reducer lens 20 and the second reducer lens 25 may be refracted at the convex incident surface 26 of the second reducer lens 25, and the width of the light transmitted through the second reducer lens 25 may be gradually reduced.

The front surface of the second reducer lens 25 may be the emitting surface 27 and the emitting surface 27 may have a concave depression curved surface toward the rear side. In some implementations, the entire front surface of the second reducer lens 25 may have a concave depression emitting surface 27. In some implementations, only the center portion of the front surface of the second reducer lens 25 may have the concave depression emitting surface 27.

The entire emitting surface 27 of the second reducer lens 25 may face the rear surface 32 of the lens 3.

The diameter D2 of the second reducer lens 25 may be smaller than the diameter D1 of the first reducer lens 20. The thickness T2 of the second reducer lens 25 may be thinner than the thickness T1 of the first reducer lens 20.

The size of the second reducer lens 25 may be smaller than the size of the first reducer lens 20 in order to increase the peripheral space utilization, since the light is primarily reduced at the first reducer lens 20.

The curvatures of the incident surface 21 of the first reducer lens 20 and the incident surface 26 of the second reducer lens 25 may be the same each other or may be different from each other.

The reduction degree of the width of the light which is transmitted through the first reducer lens 20 may be highly dependent on the curvature of the incident surface 21 of the first reducer lens 20. The reduction degree of the width of the light which is transmitted through the first reducer lens 20 may be increased as the curvature of the incident surface 21 of the first reducer lens 20 is increased.

For example, the sizes of the second reducer lens 25, the first reflecting unit 2, and the lens 3 may be decreased as the curvature of the incident surface 21 of the first reducer lens 20 is increased.

The light of which width is primarily reduced at the first reducer lens 20 may be incident on the incident surface 26 of the second reducer lens 25 and the incident surface 26 of the second reducer lens 25 is preferably configured that the light is not excessively reduced.

In a case where the curvature of the incident surface 21 of the first reducer lens 20 and the curvature of the incident surface 26 of the second reducer lens 25 are different from each other, preferably, the curvature of the incident surface 21 of the first reducer lens 20 is greater than the curvature of the incident surface 26 of the second reducer lens 25.

The curvatures of the emitting surface 22 of the first reducer lens 20 and the emitting surface 27 of the second reducer lens 25 may be the same each other or may be different from each other.

The first reducer lens 20 is configured to differentiate the width of the light emitted from the first reducer lens 20 according to the curvature of the emitting surface 22.

The emitting surface 22 of the first reducer lens 20 may have a curvature which allows the light which passes through the emitting surface 22 to be emitted in parallel. Further, the emitting surface 22 of the first reducer lens 20 may have a curvature which allows the width of the light passed through the emitting surface 22 to be gradually reduced between the emitting surface 22 of the first reducer lens 20 and the incident surface 26 of the second reducer lens 25.

Preferably, the second reducer lens 25 is configured that the width of the light which is incident on the first reflecting unit 2 may be different from each other according to the curvature of the emitting surface and the emitting surface 27 of the second reducer lens 25 is configured that the light passed through the emitting surface 27 is incident on the first reflecting unit 2 in parallel.

In a case where the curvature of the emitting surface 22 of the first reducer lens 20 and the curvature of the emitting surface 27 of the second reducer lens 25 are different from each other, preferably, the curvature of the emitting surface 27 of the second reducer lens 25 is greater than the curvature of the emitting surface 22 of the first reducer lens 20.

The lighting device 100 for a vehicle may further include a light reducer supporter 56, as shown in FIG. 3, supporting the light reducer 12.

The light reducer supporter 56 may have a shape surrounding the light reducer 12. The light reducer supporter 56 may be lengthened in the direction parallel to the optical axis X of the lens 3 and may have a light transmitting path through which light transmits in the inner portion thereof.

Further, the lighting device 100 for a vehicle may further include a lens holder 58 which supports the lens 3 and the projection lens 5.

In some implementations, the lighting device 100 may also include a heat radiation member 11, as shown in FIG. 3, which radiates heat generated in the light source 10. The heat radiation member 11 may include a contact plate which is in contact with the light source 10 and a heat radiation fin which is projected from the contact plate.

Hereinafter, an example of an operation of a lighting device 100 according to some implementations is described. Hereinafter, the light source 10 emits the blue based light and the reflective fluorescent body 4 converts the wavelength of the blue based light into the wavelength of the yellow based light, for example.

First, when the light source 10 turns on, the blue based light A may be emitted from the light source 10 and the light. The blue-based light A emitted from the light source 10 may be incident on the light reducer 12 in parallel.

The light A emitted from the light source 10 in parallel may be incident on the incident surface 21 of the first reducer lens 20, may refract at the incident surface 21 of the first reducer lens 20 and then the width of the light may be reduced.

The light refracted at the incident surface 21 of the first reducer lens 20 may transmit through the first reducer lens 20 and thus may be emitted to the emitting surface 22 of the first reducer lens 20.

The light B emitted to the emitting surface 22 of the first reducer lens 20 is incident on the incident surface 26 of the second reducer lens 25 in parallel or the width of the light B is gradually reduced between the emitting surface 22 of the first reducer lens 20 and the incident surface 26 of the second reducer lens 25 and the light B may be incident on the incident surface 26 of the second reducer lens 25.

The light which is incident on the incident surface 26 of the second reducer lens 25 may transmit through the second reducer lens 25 and thus may be emitted through the emitting surface 27 of the second reducer lens 25.

For example, the light A emitted from the light source 10 sequentially transmits through the first reducer lens 20, the air between the first reducer lens 20 and the second reducer lens 25, and the second reducer lens 25 and thus the width of the light is reduced, and the light C of which the width is reduced may be incident on the rear surface 32 of the lens 3 in parallel.

The light D which is incident on the rear surface 32 of the lens 3 transmits through the rear side area of the first reflecting unit 2 of the lens 3 and may be incident on the rear surface of the first reflecting unit 2, and then reflects from the rear surface of the first reflecting unit 2 to the lens 3.

The light E reflected from the first reflecting unit 2 may be reflected in the direction toward the optical axis X of the lens 3 and may refract at the rear surface 32 of the lens 3.

The light F refracted at the rear surface 32 of the lens 3 may be passed through between the rear surface 32 of the lens 3 and the reflective fluorescent body 4 and then may be incident on the reflective fluorescent body 4.

The wavelength of the light which is incident on the reflective fluorescent body 4 may be changed by the reflective fluorescent body 4 and the white based light F may be irradiated to the rear surface 32 of the lens 3.

The light irradiated from the reflective fluorescent body to the rear surface 32 of the lens 3 in the reflective fluorescent body 4 may transmit through the lens 3, and the light G transmits through the front surface 31 of the lens 3 and then may be incident on the projection lens 5 through the rear surface 52 of the projection lens 5.

The light which is incident on the projection lens 5 transmits through the projection lens 5, refracts at the front surface 51 of the projection lens 5 and thus may be emitted in the front side of the projection lens 5 in parallel.

The light H emitted to the front side of the projection lens 5 may be irradiated in the front side of the vehicle.

Figure 4:
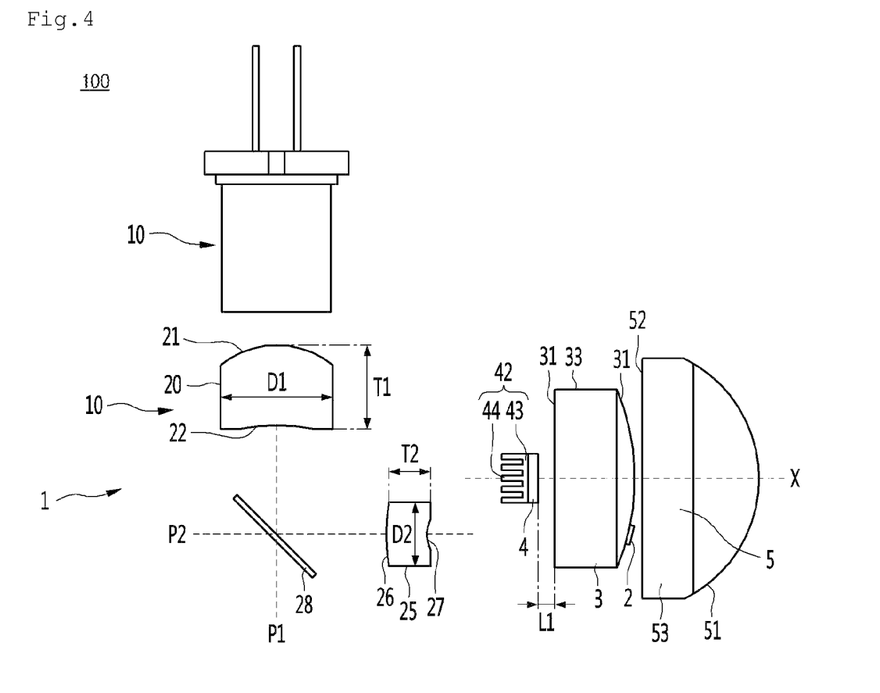
FIG. 4 is a diagram illustrating an example of a lighting device for a vehicle according to a second implementation.

FIG. 4 is a construction view illustrating a lighting device 100 for a vehicle according to a second implementation.

In the example of FIG. 4, the optical axis P1 of the first reducer lens 20 intersects with the optical axis P2 of the second reducer lens 25. The optical axis P1 of the first reducer lens 20 and the optical axis P2 of the second reducer lens 30 may have an inclined angle which is an acute angle or an obtuse angle, or may be perpendicular to each other.

An implementation may further include a reflecting member 28 which reflects the light emitted from the first reducer lens 20 to the second reducer lens 30.

The light of which the width is reduced by the first reducer lens 20 may be incident on the second reducer lens 25, and the width of the light is reduced again at the second reducer lens 25 by the reflecting member 28.

The incident surface 21 of the first reducer lens 20 may face the light source 10.

The emitting surface 22 of the first reducer lens 20 and the incident surface 26 of the second reducer lens 25 may face with each other.

The emitting surface 27 of the second reducer lens 25 may face the rear surface 32 of the lens 3. The optical axis P2 of the second reducer lens 25 is parallel to the optical axis of the lens 3. The light emitted through the emitting surface 27 of the second reducer lens 25 may be irradiated toward the first reflecting unit 2 provided on the front surface 31 of the lens 3 as in the first implementation.

The curvatures of the incident surface and the emitting surface, size relation between each other, and thickness relation between each other of each of the first reducer lens 20 and the second reducer lens 25 are same or similar to those of the first implementation.

In some implementations, the light source 10 and the first reducer lens 20 may not disposed on the rear side of the second reducer lens 25 and the first reducer lens 20 and the light source 10 may not relatively disposed on the more front side than in the case of the first implementation.

The light emitted from the light source 10 passes through the first reducer lens 20 and then may be incident on the reflecting member 28, the light path is changed in parallel to the optical axis X of the lens 3 by the reflecting member 28, and may be transmitted through the second reducer lens 25 and then may be emitted toward the first reflecting unit 2.

Figure 5:
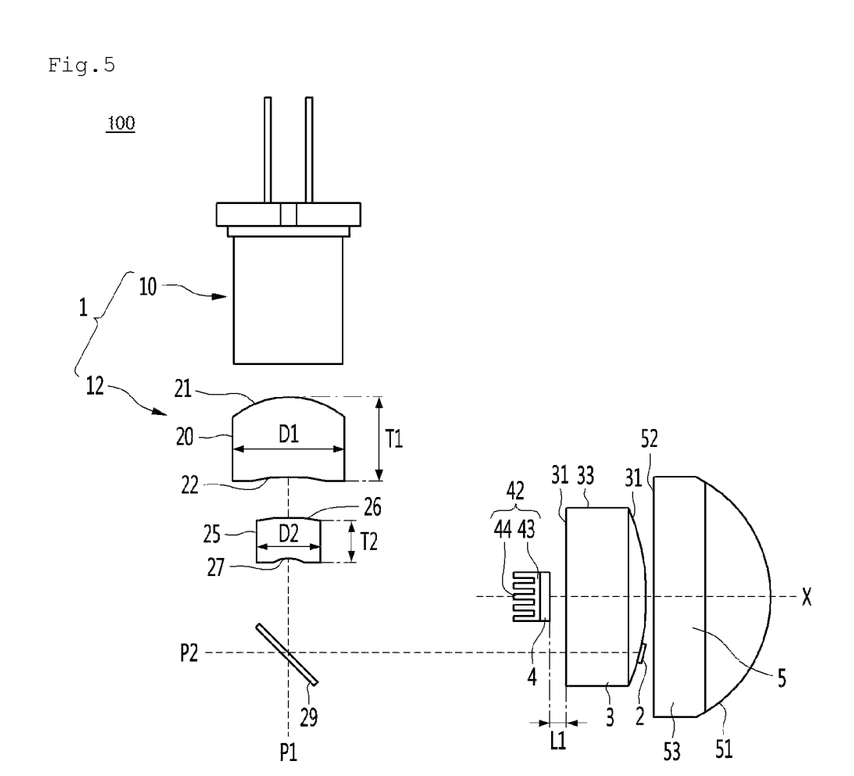
FIG. 5 is a diagram illustrating an example of a lighting device for a vehicle according to a third implementation.

FIG. 5 is a construction view illustrating a lighting device 100 for a vehicle according to a third implementation.

In the present implementation, at least one of the light source 10 or the light reducer 12 may be disposed to be spaced apart from the reflective fluorescent body 4, which is arranged on the optical axis X of lens 3.

As shown in the example of FIG. 5, the optical axis P1 of the light reducer 12 may be non-parallel to the optical axis X of the lens 3, and may intersect with the optical axis X of the lens 3.

The present implementation further includes a reflecting member 29 which reflects the light emitted from the light reducer 12 toward the first reflecting unit 2.

As in the first implementation, the light reducer 12 may include a first reducer lens 20 and a second reducer lens 25. The first reducer lens 20 and the second reducer lens 25 may have the same light axis P1 with each other.

The light of which the width is reduced by the first reducer lens 20 and the second reducer lens 25 may be incident on the lens 3 by the reflecting member 29 and transmitted through the lens 3 and then may be incident on the first reflecting unit 2.

The incident surface 21 of the first reducer lens 20 may face the light source 10.

The emitting surface 22 of the first reducer lens 20 and the incident surface 26 of the second reducer lens 25 may face each other.

The emitting surface 27 of the second reducer lens 25 may face each other.

The reflecting member 29 may reflect the light emitted from the second reducer lens 25 in parallel direction P2 to the optical axis X of the lens 3 and the light reflected from the reflecting member 29 may be irradiated toward the first reflecting unit 2 provided on the front surface 31 of the lens 3 as in the first implementation.

The curvature of the incident surface and the emitting surface, size relation between each other, and thickness relation between each other of each of the first reducer lens 20 and the second reducer lens 25 are same or similar to those of the first implementation.

In a case of the present implementation, the light source 10 and the reducer 12 may be more closely disposed to the lens 3. In the present implementation, the light source 10 and the reducer 12 is relatively positioned at the more front side than in a case of the first implementation.

The light emitted from the light source 10 passes through the first reducer lens 20 and then may be passed through the second reducer lens 25, the light path is changed in parallel to the optical axis X of the lens 3 by the reflecting member 29, and may be transmitted through the lens 3 and then may be emitted toward the first reflecting unit 2.

FIG. 6 is a construction view illustrating a lighting device 100 for a vehicle according to a fourth implementation.

The present implementation may include a second reflecting unit 6 which reflects light which reflects from the reflective fluorescent body 4 to the lens 3 to the rear side of the lens 3. Since the other constructions and the effects other than the second reflecting unit 6 and their effects are the same or similar to the first implementation to third implementation, the other constructions other than the second reflecting unit 6 use the same numerical references as the first implementation to third implementation.

The second reflecting unit 6 may be provided to be spaced apart from the first reflecting unit 2 in the front surface 31 of the lens 3 and may reflect the light reflected from the reflective fluorescent body 4 in the rear side of the lens 3.

Each of the first reflecting unit 2 and the second reflecting unit 6 may be provided on the front surface of the lens 3.

The first reflecting unit 2 and the second reflecting unit 6 may have an arc shape as a cross-sectional shape on the convex front surface 31 of the lens 3, respectively.

The first reflecting unit 2 and the second reflecting unit 6 may have a concave mirror formed along the front surface 31 of the lens 3 on the convex front surface 31 of the lens 3, respectively.

The first reflecting unit 2 and the second reflecting unit 6 may be provided to be spaced apart with each other. The first reflecting unit 2 and the second reflecting unit 6 may be provided symmetrically relative to the optical axis X of the lens 3.

The first reflecting unit 2 and the second reflecting unit 6 may be provided symmetrically to have a 180° phase difference to the front surface 31 of the lens 3. In a case where the first reflecting unit 2 may be provided on the left area of the front surface 31 of the lens 3, the second reflecting unit 6 may be provided on the upper side area of the front surface 31 of the lens 3. In a case where the first reflecting unit 2 may be provided on the right area of the front surface 31 of the lens 3, the second reflecting unit 6 may be provided on the lower side area of the front surface 31 of the lens 3.

The first reflecting unit 2 and the second reflecting unit 6 may be provided at the same distance from the optical axis X of the lens with each other or at the different distance from the optical axis X of the lens with each other.

In a case where the first reflecting unit 2 and the second reflecting unit 6 is provided at the same distance from the optical axis X of the lens 3, any one of two reflecting unit may serves as the first reflecting unit 2, and the other of two reflecting unit may serves as the second reflecting unit 6. Convenience of the operator may be improved. Since two reflecting units need not distinguish from each other at the mounting or service of the lens 3.

The first distance between the first reflecting unit 2 and the optical axis X of the lens 3 may be shorter or longer than the second distance between the second reflecting unit 6 and the optical axis X of the lens 3. In this case, the light source apparatus 1 may be installed in the position which any one of the two reflecting unit faces each other and the position which allows the lighting device 100 for a vehicle to be made compact or allows the efficiency of the lighting device 100 for a vehicle to be optimized. In a case where the light source apparatus 1 faces any one of two reflecting units, the reflecting unit facing the light source apparatus 1 serves as the first reflecting unit 2 and the reflecting unit which does not face the light source apparatus 1 serves as the second reflecting unit 6.

The light source apparatus 1 and the detecting unit 7 may be installed in the optimal position in which the efficiency of the lighting device 100 for a vehicle may be increased.

The first reflecting unit 2 and the second reflecting unit 6 is made of a reflective coating layer coated on the portion other than the optical axis X of the lens 3 of the front surface of the lens 3 or is made of a reflective seat attached to the portion other than the optical axis X of the lens 3 of the front surface of the lens 3.

The first reflecting unit 2 may reflect light which is emitted from the light source apparatus 1 and then is transmitted through the lens 3 to the reflective fluorescent body 4 the light reflected from the reflective fluorescent body 4 may be transmitted through the lens and a portion of the light reflected to the lens from reflective fluorescent body 4 may be incident on the second reflecting unit 6. The light which is incident from the reflective fluorescent body 4 to the second reflecting unit 6 may be reflected in the rear direction of the lens 3 by the second reflecting unit 6.

The light I reflected in the rear direction of the lens 3 by the second reflecting unit 6 transmits through the rear surface 32 of the lens 3 and the light J which is reflected from the second reflecting unit 6 and is transmitted through the rear surface 32 of the lens 3 may be radiated in the rear side of the lens 3.

The second reflecting unit 6 may minimize the light leak phenomenon which may be generated when the light which is reflected in the reflective fluorescent body 4 transmitted through the area on which the second reflecting unit 6 is formed.

FIG. 7 is a construction view illustrating an optical path of the lighting device 100 for a vehicle according to a fifth implementation.

The present implementation may include a detecting unit 7 which detects light J reflected to the rear side of the lens 3 at the second reflecting unit 6, and a control unit 8 which controls the light source 10 according to the detection value of the detecting unit 7. Since the other constructions and the effects other than the detecting unit 7 and the control unit 8 are the same or similar to the fourth implementation, the other constructions other than the detecting unit 7 and the control unit 8 use the same numerical references as the fourth implementation.

The detecting unit 7 may be disposed on the rear side of the lens 3. The detecting unit 7 is disposed outside of the optical axis X of the lens 3.

The detecting unit 7 may include a first filter 71 through which blue light is transmitted, a first optical sensor 72 that detects light transmitted through the first filter 71, a second filter 73 that blocks blue light, and a second optical sensor 74 that detects light transmitted through the second filter 73. In this example, the blue light may be a blue-based light.

The present implementation may further include a third filter 78 which is disposed on the front side of the first filter 71 and the second filter 73 and detects light which is towards the first filter 71 and the second filter 73.

The control unit 8 may be configured such that the light source apparatus 1 is turned off when the control unit 8 detects light which is greater than the reference value at the first optical sensor 72. The control unit 8 may allow the light source apparatus 1 to be turned off when the control unit 8 detects light which is equal to and less than the reference value or does not detect light in the second optical sensor 74.

In a scenario in which the light which is greater than the reference value is detected at the first optical sensor 72, this scenario may correspond to the reflective fluorescent body 4 not converting the blue-based light into white-based light, or the degree of such conversion being insignificant. In this scenario, blue-based light which exceeds the safety range may be emitted to the front side of a vehicle. To mitigate the risk of such a scenario, the light source apparatus 1, for example the light source 10, may be configured to be turned off in order to avoid emitting blue-based light to the front side of the vehicle.

Further, in a scenario in which light which is less than or equal to the reference value is not detected at the second optical sensor 74, this scenario may correspond to the reflective fluorescent body 4 not functioning normally or the second reflecting unit 6 having failed. In this scenario, it may be difficult to perform an optical conversion function by the reflective fluorescent body 4 or to perform a safety function using the second reflecting unit 6, the detecting unit 7 and the control unit 8. As such, to mitigate such a scenario, the light source apparatus 1, for example the light source 10, may be configured to be turned off.

Although implementations have been described with reference to a number of illustrative examples thereof, it should be understood that numerous other modifications and implementations may be devised.

Accordingly, implementations are disclosed herein merely for illustrative purposes and do not limit the technical scope of the present disclosure, and the scope of the technical spirits of the present disclosure is not limited by the implementations disclosed herein.

In addition, the protective scope of the present disclosure should be construed by the following claims, and all technical spirits within a scope equivalent to the protective scope will be construed as being included in the scope of the disclosure.

What is claimed is:

1. A lighting device for a vehicle, comprising:
   a light source;
   a lens;
   a first reflecting unit provided on a partial area of a front surface of the lens;
   a light reducer configured to reduce a size of light emitted from the light source and to emit light having a reduced size toward the first reflecting unit on the lens;
   a reflective fluorescent body disposed on a rear side of the lens and configured to convert a wavelength of light reflected from the first reflecting unit and to reflect light having a converted wavelength into the lens; and
   a heat radiating member configured to dissipate heat from the reflective fluorescent body.

2. The lighting device for a vehicle according to claim 1, wherein the front surface of the lens has a convex shape, and
wherein the first reflecting unit is configured with a cross sectional shape that is an arc shape.

3. The lighting device for a vehicle according to claim 1, wherein the first reflecting unit is a concave mirror which is formed in the front surface of the lens.

4. The lighting device for a vehicle according to claim 1, wherein the first reflecting unit is a reflective coating layer which is coated on a portion of the front surface of the lens that does not intersect an optical axis of the lens.

5. The lighting device for a vehicle according to claim 1, wherein the reflective fluorescent body is disposed to face a rear surface of the lens and is configured to reflect, toward the rear surface of the lens, the light having the converted wavelength.

6. The lighting device for a vehicle according to claim 1, wherein the light reducer is disposed at a position between the lens and the light source.

7. The lighting device for a vehicle according to claim 1, wherein the reflective fluorescent body is disposed on an optical axis of the lens, and
wherein the light reducer is disposed apart from the optical axis of the lens.

8. The lighting device for a vehicle according to claim 1, wherein the light reducer is disposed on a rear side of the lens and is configured to emit the light having the converted wavelength in a direction parallel to an optical axis of the lens.

9. The lighting device for a vehicle according to claim 1, wherein the light reducer comprises:
   a first reducer lens configured to reduce a width of light transmitted therethrough that was emitted from the light source; and
   a second reducer lens that is spaced apart from the first reducer lens and that is configured to reduce a width of light transmitted therethrough that was emitted from the first reducer lens.

10. The lighting device for a vehicle according to claim 9, wherein an emitting surface of the first reducer lens and an incident surface of the second reducer lens are spaced apart from each other.

11. The lighting device for a vehicle according to claim 9, wherein a diameter of the second reducer lens is smaller than a diameter of the first reducer lens.

12. The lighting device for a vehicle according to claim 9, wherein a thickness of the second reducer lens is smaller than a thickness of the first reducer lens.

13. The lighting device for a vehicle according to claim 9, wherein an incident surface of the first reducer lens on which light is incident has a convex shape.

14. The lighting device for a vehicle according to claim 9, wherein an emitting surface of the second reducer lens from which light is emitted has a concave shape.

15. The lighting device for a vehicle according to claim 9, wherein an optical axis of the first reducer lens is the same as an optical axis of the second reducer lens.

16. The lighting device for a vehicle according to claim 9,
wherein an incident surface of the first reducer lens is configured to face the light source, and
wherein an emitting surface of the second reducer lens is configured to face a rear surface of the first lens.

17. The lighting device for a vehicle according to claim 9,
wherein the first reducer lens and the second reducer lens are configured such that an optical axis of the first reducer lens intersects with an optical axis of the second reducer lens.

18. The lighting device for a vehicle according to claim 17, further comprising:
a reflecting member configured to reflect, to the second reducer lens, the light emitted from the first reducer lens.

19. The lighting device for a vehicle according to claim 1,
wherein the reflective fluorescent body is disposed on an optical axis of the lens, and
wherein the light reducer is arranged to be spaced apart from the reflective fluorescent body in the optical axis of the lens.

20. The lighting device for a vehicle according to claim 1, further comprising:
a second reflecting unit provided to be spaced apart from the first reflecting unit on the front surface of the lens and configured to reflect, to a rear side of the lens, light that is reflected from the reflective fluorescent body.

* * * * *